United States Patent
Kozato et al.

(10) Patent No.: US 8,606,985 B2
(45) Date of Patent: Dec. 10, 2013

(54) CONTROLLED DEVICE TO CONTROL SWITCHING BETWEEN TRANSMISSION PATHS FOR TRANSMITTING DATA AT DIFFERENT RATE

(75) Inventors: Atsushi Kozato, Tokyo (JP); Koji Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 193 days.

(21) Appl. No.: 13/198,329

(22) Filed: Aug. 4, 2011

(65) Prior Publication Data
US 2012/0036295 A1 Feb. 9, 2012

(30) Foreign Application Priority Data
Aug. 9, 2010 (JP) ................................. 2010-178335

(51) Int. Cl.
*G06F 13/00* (2006.01)
(52) U.S. Cl.
USPC ........................................ 710/315; 710/316
(58) Field of Classification Search
USPC ..................... 710/308, 315, 316; 711/115
See application file for complete search history.

(56) References Cited

U.S. PATENT DOCUMENTS 8,161,224 B2 * 4/2012 Laurencin et al. ............. 710/315
2010/0049895 A1 * 2/2010 Liang ............................ 710/308

FOREIGN PATENT DOCUMENTS

JP 11-338687 A 12/1999

* cited by examiner

Primary Examiner — Glenn A Auve

(57) ABSTRACT

The controlled device includes: an external terminal; a memory; a processor for controlling the memory according to a control signal received via the external terminal; a plurality of buses forming a first transmission path connecting the external terminal and the memory via the processor, and a second transmission path connecting the external terminal and the memory directly by bypassing the processor; and a switching unit for switching a transmission state to either a first transmission state in which one or more of the buses forming the first transmission path are caused to transmit the control signal from the external terminal to the processor according to a first protocol, or a second transmission state in which one or more of the buses forming the second transmission path are caused to transmit data directly between the external terminal and the memory according to a second protocol capable of transmitting data at a higher rate than the first protocol.

6 Claims, 4 Drawing Sheets

CONTROLLED DEVICE TO CONTROL SWITCHING BETWEEN TRANSMISSION PATHS FOR TRANSMITTING DATA AT DIFFERENT RATE

This application is based on and claims the benefit of priority from Japanese Patent Application No. 2010-178335, filed Aug. 9, 2010, the disclosure of which is incorporated herein in its entirety by reference.

FIELD OF THE INVENTION

This invention relates to a controlled device which is controlled by a control signal received from a controller.

BACKGROUND OF THE INVENTION

Controlled devices are known, which are controlled by a control signal received from a controller (external equipment). Japanese Laid-Open Patent Publication No. H11-338687 (Patent Document 1) discloses a controlled device (expansion unit) as one of such controlled devices, which has an external terminal, a bus interface connected to the external terminal, a memory for storing data, and a processor for receiving a control signal via the external terminal and controlling the memory based on the received control signal. The bus interface is connected to both of the memory and the processor.

This controlled device switches between a first connection state in which the memory and the external terminal are connected via the processor and a second connection state in which the memory and the external terminal are directly connected without involving the processor. Thus, the controlled device is allowed to transmit data between the controller and the memory without involving the processor by switching over the connection state to the second connection state.

SUMMARY OF THE INVENTION $I^2C$ (Inter-Integrated Circuit) protocol is well known in this field of technology. The $I^2C$ protocol requires a relatively small number of signal lines, which makes it possible to reduce the number of terminals. This is a reason why a bus designed to be able to transmit control signals according to the $I^2C$ protocol is often used as a bus for connection between an external terminal and a bus interface.

For example, an optical transceiver receiving an optical signal is required by the standards (e.g. XFP (10(X) Gigabit Small Form Factor Pluggable)) to use a bus designed to be able to transmit control signals according to the $I^2C$ protocol as a bus for transmitting control signals.

SPI (Serial Peripheral Interface) protocol is also well known. Data is transmitted at a higher rate according to the SPI protocol than according to the $I^2C$ protocol. For example, the transmission rate of data according to the $I^2C$ protocol is about 400 kbps, whereas the transmission rate of data according to the SPI protocol is about 10 Mbps. This is a reason why a bus designed to be able to transmit data according to the SPI protocol is often used as a bus for connection between a processor and a memory.

It is assumed here that the aforementioned controlled device is configured to use a bus designed to be able to transmit control signals according to the $I^2C$ protocol as a bus for connection between the external terminal and the bus interface, while using a bus designed to be able to transmit data according to the SPI protocol as a bus for connection between the processor and the memory.

In this case, in which a bus designed to be able to transmit control signals according to the $I^2C$ protocol is used as the bus for connection between the external terminal and the bus interface, data cannot be transmitted between the external terminal and the memory once the connection state is switched over to the second connection state.

When the connection state is switched over to the first connection state, the transmission rate between the external terminal and bus interface assumes the upper limit value of the transmission rate between the external terminal and the memory. Furthermore, a delay time occurs due to the conversion process which the processor is required to perform in order to convert data according to the $I^2C$ protocol into data according to the SPI protocol.

Therefore, the aforementioned controlled device has a disadvantage that an excessively long time is required to transmit data between the controller and the memory. This in turn excessively increases the time required to store (write) data received from the controller in the memory.

An object of the invention therefore is to provide a controlled device which is capable of solving the problem that an excessively long time is required to transmit data between a controller and a memory.

In order to achieve such object, one aspect of this invention provides a controlled device which includes: an external terminal; a memory for storing data; a processor for receiving a control signal via the external terminal and controlling the memory based on the received control signal; a plurality of buses forming a first transmission path connecting the external terminal and the memory via the processor, and a second transmission path connecting the external terminal and the memory directly by bypassing the processor; and a switching unit for switching a transmission state to either a first transmission state in which one or more of the buses forming the first transmission path are caused to transmit the control signal from the external terminal to the processor according to a first protocol and to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol.

Another aspect of this invention provides a controlled method which is applicable to a controlled device including: an external terminal; a memory for storing data; a processor for receiving a control signal via the external terminal and controlling the memory based on the received control signal; and a plurality of buses forming a first transmission path connecting the external terminal and the memory via the processor, and a second transmission path connecting the external terminal and the memory directly by bypassing the processor. The controlled method includes switching a transmission state to either a first transmission state in which one or more of the buses forming the first transmission path are caused to transmit the control signal from the external terminal to the processor according to a first protocol and to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol.

Another aspect of this invention provides a controller which is configured to be connectable to an external terminal provided in a controlled device and includes: a control signal output unit for outputting a control signal to the controlled device via the external terminal according to a first protocol, the control signal being for causing a processor provided in the controlled device to control a memory; and an instruction signal output unit for outputting an instruction signal to the controlled device via the external terminal according to a second protocol capable of transmitting data at a higher rate than the first protocol, the instruction signal being for instructing the controlled device to directly exchange data between the controller and the memory provided in the controlled device.

Another aspect of this invention provides a control system including a controller and a controlled device. The controlled device includes: an external terminal; a memory for storing data; a processor for receiving a control signal via the external terminal and controlling the memory based on the received control signal; and a plurality of buses forming a first transmission path connecting the external terminal and the memory via the processor, and a second transmission path connecting the external terminal and the memory directly by bypassing the processor.

Additionally, the controller is configured to be connectable to the external terminal provided in the controlled device, and includes: a control signal output unit for outputting a control signal to the controlled device via the external terminal according to a first protocol, the control signal being for causing the processor provided in the controlled device to control the memory, and an instruction signal output unit for outputting an instruction signal to the controlled device via the external terminal according to a second protocol capable of transmitting data at a higher rate than the first protocol, the instruction signal being for instructing the controlled device to directly exchange data with the memory provided in the controlled device.

The controlled device further includes a switching unit for switching a transmission state to either a first transmission state in which one or more of the buses forming the first transmission path are caused to transmit the control signal from the external terminal to the processor according to the first protocol and to transmit data between the processor and the memory according to the second protocol, or a second transmission state in which one or more of the buses forming the second transmission path are caused to transmit data directly between the external terminal and the memory according to the second protocol.

The features of this invention as described above make it possible to rapidly transmit data between the controller and the memory.

DETAILED DESCRIPTION OF EXEMPLARY EMBODIMENTS

Preferred exemplary embodiments of a controlled device, a controlled method, a controller, and a control system according to this invention will be described with reference to FIGS. 1 to 5.

First Embodiment (Configuration)

Figure 1:
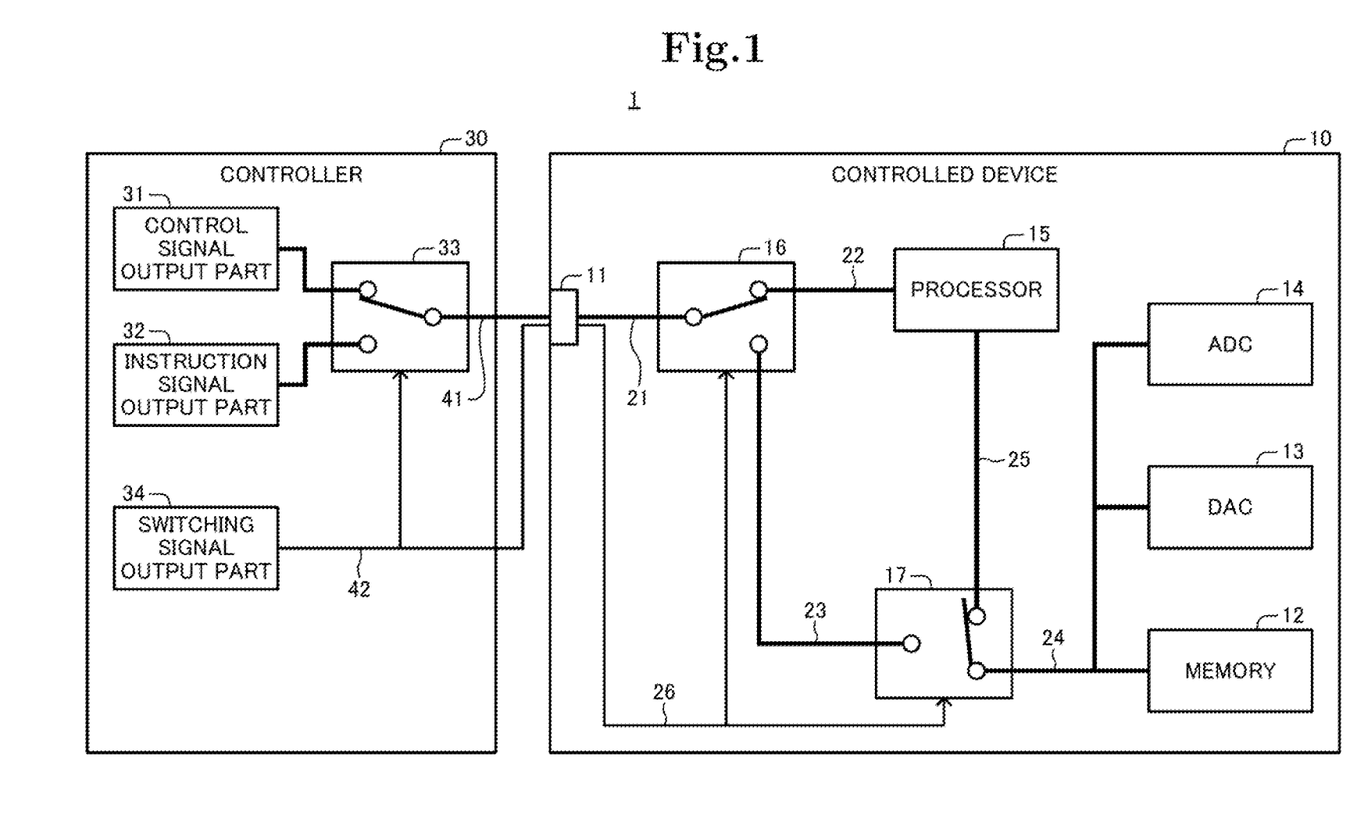
FIG. 1 is a block diagram schematically illustrating a configuration of a control system according to a first embodiment of this invention when a controlled device is in a first transmission state.

As shown in FIG. 1, a control system 1 according to a first embodiment includes a controlled device 10 and a controller (external equipment) 30. In the shown example, the controlled device 10 is an optical transceiver for receiving optical signals. However, the controlled device 10 may be any other suitable device rather than the optical transceiver. The controller 30 in this embodiment is a personal computer. However, the controller 30 may be a FPGA (Field Programmable Gate Array) or the like.

The controlled device 10 includes an external terminal 11, a memory 12, a DAC (Digital-to-Analog Converter) 13, an ADC (Analog-to-Digital Converter) 14, a processor 15, a first switch (part of a switching unit) 16, a second switch (part of the switching unit) 17, a common bus 21, a first bus 22, a second bus 23, a third bus 24, a fourth bus 25, and a switching signal line 26.

The controller 30 includes a control signal output part (control signal output unit) 31, an instruction signal output part (instruction signal output unit) 32, a switch 33, a switching signal output part (switching signal output unit) 34, an output signal line 41, and a switching signal line 42.

First, the components of the controlled device 10 will be described in detail.

The external terminal 11 is configured such that the output signal line 41 and the switching signal line 42 of the controller 30 can be connected thereto.

The memory 12 receives an instruction signal output by the processor 15 and an instruction signal output by the controller 30. The instruction signal is a write instruction signal, a read instruction signal or the like. The write instruction signal is a signal to instruct to store (write) data in the memory 12. The read instruction signal is a signal to instruct to read data stored in the memory 12.

Upon receiving a write instruction signal, the memory 12 stores data according to the received write instruction signal. Upon receiving a read instruction signal, the memory 12 outputs (allows to retrieve) data stored therein according to the received read instruction signal.

In this embodiment, the memory 12 is a non-volatile memory.

The DAC 13 is a converter for converting a digital signal into an analog signal.

The ADC 14 is a converter for converting an analog signal to a digital signal.

The processor 15 receives a control signal output by the controller 30 and transmitted through the external terminal 11. The control signal is a signal to cause the processor 15 to control the memory 12, the DAC 13, and the ADC 14. The processor 15 generates an instruction signal based on the received control signal, and outputs the generated instruction signal to any of the memory 12, the DAC 13, and the ADC 14.

The processor 15 in this embodiment is a central processing unit (CPU).

The common bus 21 is a bus designed to be able to transmit data according to any one of the first and second protocols. This means that the common bus 21 is able to transmit data according to the first protocol, and is also able to transmit data according to the second protocol. The second protocol is a protocol which is capable of transmitting data at a higher rate (at a higher transfer rate) than the first protocol.

The first protocol in this embodiment is I²C (Inter-Integrated Circuit) protocol. The second protocol is SPI (Serial Peripheral Interface) protocol.

The common bus 21 is connected to the external terminal 11 at one end thereof, and is connected to the first switch 16 at the other end.

The first bus 22 is a bus designed to be able to transmit data according to the first protocol. The first bus 22 is connected to the first switch 16 at one end thereof, and is connected to the processor 15 at the other end. As described later, the end of the first bus 22 connected to the first switch 16 is configured to be connectable, via the first switch 16, to the end of the common bus 21 not connected to the external terminal 11.

The second bus 23 is a bus designed to be able to transmit data according to the second protocol. The second bus 23 is connected to the first switch 16 at one end thereof, and is connected to the second switch 17 at the other end.

As described later, the end of the second bus 23 connected to the first switch 16 is configured to be connectable, via the first switch 16, to the end of the common bus 21 not connected to the external terminal 11. Likewise, the end of the second bus 23 connected to the second switch 17 is configured to be connectable, via the second switch 17, to the end of the third bus 24 not connected to the memory 12.

The third bus 24 is a bus designed to be able to transmit data according to the second protocol. One end of the third bus 24 is connected to the memory 12, the DAC 13, and the ADC 14. This means that the one end of the third bus 24 is branched. The other end of the third bus 24 is connected to the second switch 17.

As described later, the end of the third bus 24 connected to the second switch 17 is configured to be connectable, via the second switch 17, to the end of the second bus 23 or the fourth bus 25.

The fourth bus 25 is a bus designed to be able to transmit data according to the second protocol. The fourth bus 25 is connected to the second switch 17 at one end thereof, and is connected to the processor 15 at the other end. As described later, the end of the fourth bus 25 connected to the second switch 17 is configured to be connectable, via the second switch 17, to the end of the third bus 24 not connected to the memory 12.

The switching signal line 26 transmits a switching signal. One end of the switching signal line 26 is connected to the external terminal 11. The other end of the switching signal line 26 is connected to the first switch 16 and the second switch 17.

A connection state of the first switch 16 is switchable between a first connection state and a second connection state. The first connection state is a connection state in which the common bus 21 and the first bus 22 are connected to each other while the common bus 21 and the second bus 23 are disconnected from each other. The second connection state is a connection state in which the common bus 21 and the first bus 22 are disconnected from each other while the common bus 21 and the second bus 23 are connected to each other.

The first switch 16 receives a switching signal through the switching signal line 26. The switching signal is either a first switching signal or a second switching signal. When the switching signal received by the first switch 16 is the first switching signal, the first switch 16 switches the connection state from the second connection state to the first connection state (sets the connection state to the first connection state). When the switching signal received by the first switch 16 is the second switching-signal, the first switch 16 switches the connection state from the first connection state to the second connection state (sets the connection state to the second connection state).

A connection state of the second switch 17 is switchable between a first connection state and a second connection state. The first connection state is a connection state in which the third bus 24 and the fourth bus 25 are connected to each other while the third bus 24 and the second bus 23 are disconnected from each other. The second connection state is a connection state in which the third bus 24 and the fourth bus 25 are disconnected from each other while the third bus 24 and the second bus 23 are connected to each other.

The second switch 17 receives a switching signal through the switching signal line 26. When the switching signal received by the second switch 17 is the first switching signal, the second switch 17 switches the connection state from the second connection state to the first connection state (sets the connection state to the first connection state). On the other hand, when the switching signal received by the second switch 17 is the second switching signal, the second switch 17 switches the connection state from the first connection state to the second connection state (sets the connection state to the second connection state).

The common bus 21, the first bus 22, the fourth bus 25, and the third bus 24 together form a first transmission path, which connects the external terminal 11 and the memory 12 via the processor 15. The common bus 21, the second bus 23, and the third bus 24 together form a second transmission path, which connects the external terminal 11 and the memory 12 directly by bypassing the processor 15.

Thus, upon receiving the first switching signal, the controlled device 10 configured as described above switches the transmission state to a first transmission state by switching the first switch 16 to the first connection state and switching the second switch 17 to the first connection state.

The first transmission state is a transmission state in which the buses forming the first transmission path are caused to transmit a control signal from the external terminal 11 to the processor 15 according to the first protocol, and at the same time to transmit data between the processor 15 and the memory 12 according to the second protocol.

Figure 3:
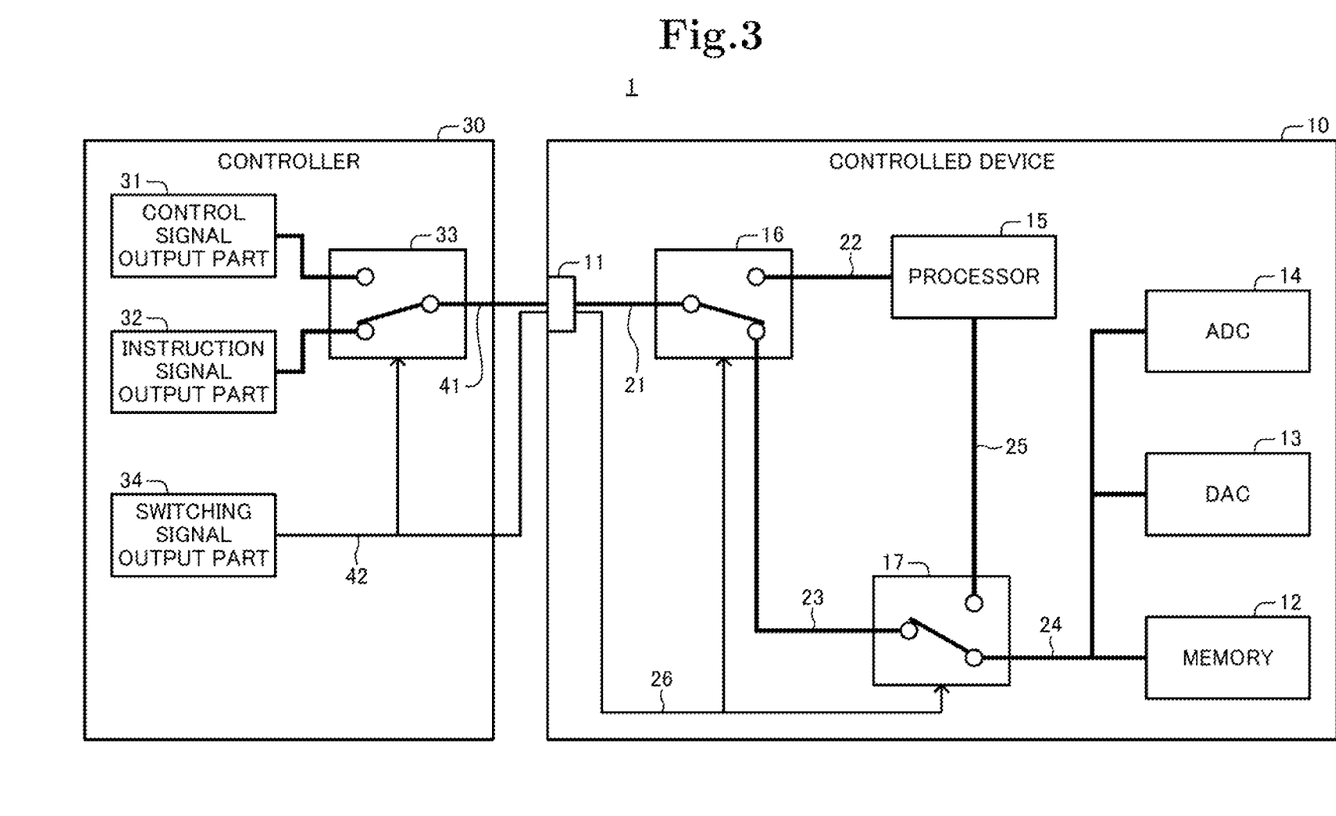
FIG. 3 is a block diagram schematically illustrating the control system according to the first embodiment of this invention when the controlled device is in a second transmission state.

Upon receiving the second switching signal, the controlled device 10 switches the transmission state to a second transmission state by switching the first switch 16 to the second connection state and switching the second switch 17 to the second connection state.

The second transmission state is a transmission state in which one or more of the buses forming the second transmission path are caused to transmit data directly between the external terminal 11 and the memory 12 according to the second protocol.

Next, the components of the controller 30 will be described in detail.

According to the first embodiment, the control signal output part 31 and the switch 33 are connected through a bus designed to be able to transmit data according to the first protocol. The control signal output part 31 outputs a control signal to the switch 33 according to the first protocol. In this first embodiment, the control signal output part 31 outputs a control signal when the switching signal output part 34 to be described later outputs the first switching signal.

According to this first embodiment, the instruction signal output part 32 and the switch 33 are connected by a bus designed to be able to transmit data according to the second protocol. The instruction signal output part 32 outputs an instruction signal to the switch 33 according to the second protocol. In this embodiment, the instruction signal output part 32 outputs an instruction signal when the switching signal output part 34 to be described later outputs the second switching signal.

A connection state of the switch 33 is switchable between a first connection state and a second connection state. The first connection state is a connection state in which the control signal output part 31 and the output signal line 41 are connected to each other, while the instruction signal output part 32 and the output signal line 41 are disconnected from each other. The second connection state is a connection state in which the control signal output part 31 and the output signal line 41 are disconnected from each other, while the instruction signal output pan 32 and the output signal line 41 are connected to each other.

The switch 33 receives a switching signal through the switching signal line 42. When the received switching signal is the first switching signal, the switch 33 switches the connection state from the second connection state to the first connection state (sets the connection state to the first connection state). When the received switching signal is the second switching signal, the switch 33 switches the connection state from the first connection state to the second connection state (sets the connection state to the second connection state).

The switching signal output part 34 outputs either the first switching signal or the second switching signal to the switching signal line 42.

The output signal line 41 is a signal line designed to be able to transmit data according to any one of the first protocol and the second protocol. One end of the output signal line 41 is connected the switch 33, while the other end is configured to be connectable to the external terminal 11.

The controller 30, configured as described above, outputs the control signal output by the control signal output part 31 to the controlled device 10 via the external terminal 11 according to the first protocol when the switch 33 is set to the first connection state. The controller 30 outputs the instruction signal output by the instruction signal output part 32 to the controlled device 10 via the external terminal 11 according to the second protocol when the switch 33 is set to the second connection state.

The switching signal line 42 transmits the switching signal output by the switching signal output part 34. One end of the switching signal line 42 is connected to the switching signal output part 34. The other end of the switching signal line 42 is connected to the switch 33 and the external terminal 11.

(Operation)

Next, operation of the above-described control system 1 will be described with reference to FIGS. 2 to 4.

A case is assumed here in which a process is implemented to cause the memory 12 to store data in the memory 12 in the course of manufacturing the controlled device 10.

In this case, the output signal line 41 and the switching signal line 42 of the controller 30 are first connected to the external terminal 11 of the controlled device 10. Further, the switching signal output part 34 of the controller 30 outputs the second switching signal to the switching signal line 42 (step S11 in FIG. 2).

As a result, as shown in FIG. 3, the connection state of the switch 33 of the controller 30 is switched from the first connection state to the second connection state. The connection state of the first switch 16 of the controlled device 10 is also switched from the first connection state to the second connection state. In addition, the connection state of the second switch 17 of the controlled device 10 is also switched from the first connection state to the second connection state.

Figure 2:
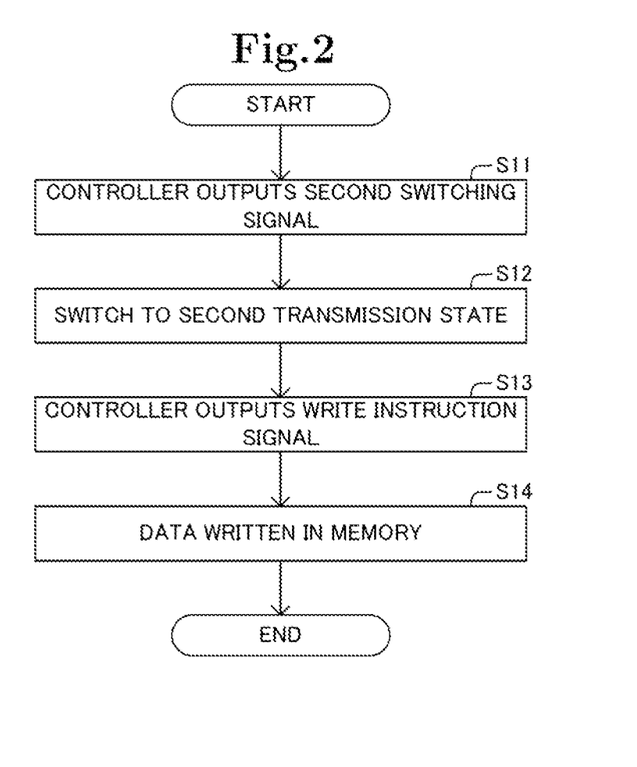
FIG. 2 is a flowchart schematically illustrating operation of the control system according to the first embodiment of this invention.

In this manner, the transmission state of the controlled device 10 is switched from the first transmission state to the second transmission state (step S12 in FIG. 2). This means that the controlled device 10 is enabled to transmit data directly between the external terminal 11 and the memory 12 according to the second protocol.

The controller 30 is enabled to output the instruction signal output by the instruction signal output part 32 to the controlled device 10 according to the second protocol.

The instruction signal output part 32 of the controller 30 then outputs a write instruction signal as the instruction signal to the output signal line 41 according to the second protocol (step S13 in FIG. 2). In this embodiment, the write instruction signal contains data to be stored in the memory 12.

The write instruction signal output by the controller 30 is input to the controlled device 10 via the external terminal 11. The controlled device 10 transmits the write instruction signal to the memory 12 through the common bus 21, the second bus 23, and the third bus 24 according to the second protocol. This means that the controlled device 10 transmits the write instruction signal from the external terminal 11 to the memory 12 without passing through the processor 15 (i.e. by bypassing the processor 15).

Thus, the memory 12 receives the write instruction signal. The memory 12 stores the data contained in the write instruction signal based on the received write instruction signal (step S14 in FIG. 2).

A case is assumed in which the controller 30 then retrieves data stored in the memory 12 of the controlled device 10.

In this case, the output signal line 41 and the switching signal line 42 of the controller 30 are connected to the external terminal 11 of the controlled device 10 in the first step. Then, the switching signal output part 34 of the controller 30 outputs the first switching signal to the switching signal line 42 (step S21 in FIG. 4).

As a result, as shown in FIG. 1, the connection state of the switch 33 of the controller 30 is switched from the second connection state to the first connection state. The connection state of the first switch 16 of the controlled device 10 is also switched from the second connection state to the first connection state. In addition, the connection state of the second switch 17 of the controlled device 10 is also switched from the second connection state to the first connection state.

Figure 4:
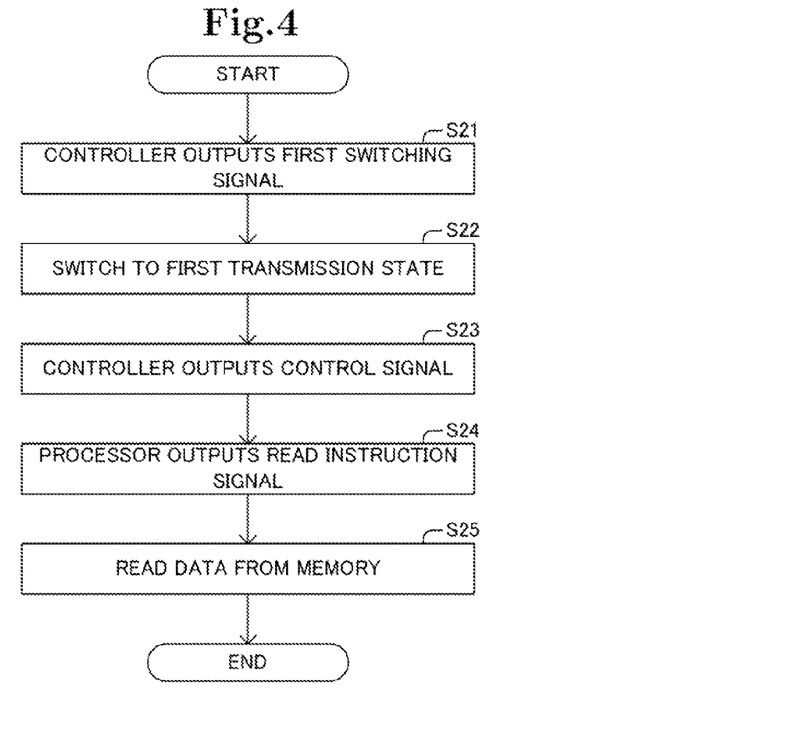
FIG. 4 is a flowchart schematically illustrating operation of the control system according to the first embodiment of this invention.

Thus, the transmission state of the controlled device 10 is switched from the second transmission state to the first transmission state (step S22 in FIG. 4). Specifically, the controlled device 10 becomes able to transmit a control signal from the external terminal 11 to the processor 15 according to the first protocol, and to transmit data between the processor 15 and the memory 12 according to the second protocol.

The controller 30 becomes able to output a control signal received from the control signal output part 31 to the controlled device 10 according to the first protocol.

The control signal output part 31 of the controller 30 then outputs a control signal to the output signal line 41 according to the first protocol (step S23 in FIG. 4). In this embodiment, the control signal is a signal for causing the processor 15 to control the memory 12 so that data stored in the memory 12 is retrieved.

The control signal output by the controller 30 is input to the controlled device 10 via the external terminal 11. The controlled device 10 transmits this control signal to the processor 15 according to the first protocol through the common bus 21 and the first bus 22.

The processor 15 thus generates a read instruction signal, and outputs the generated read instruction signal to the fourth bus 25 (step S24 in FIG. 4). The controlled device 10 transmits this read instruction signal to the memory 12 according to the second protocol through the fourth bus 25 and the third bus 24.

The memory 12 thus receives the read instruction signal. The memory 12 then reads the stored data based on the read instruction signal. Subsequently, the memory 12 outputs the read data to the third bus 24.

Thus, the controlled device 10 transmits the read data to the processor 15 according to the second protocol through the third bus 24 and the fourth bus 25. The processor 15 further transmits the received data to the external terminal 11 according to the first protocol through the first bus 22 and the common bus 21, and outputs this transmitted data to the controller 30 via the external terminal 11.

In this manner, the controller 30 acquires the data stored in the memory 12. In other words, the controller 30 reads the data stored in the memory 12 (step S25 in FIG. 4).

As described above, the control system 1 according to the first embodiment of this invention is capable of transmitting data between the external terminal 11 and the memory 12 according to the second protocol by switching the transmission state to the second transmission state. This enables rapid data transmission between the external terminal 11 and the memory 12 without increasing the number of external terminals 11. As a result, data received from the controller 30 can be rapidly stored (written) in the memory 12.

In an optical transceiver, a relatively large number of control parameters must be preliminarily stored in a memory in order to control the output of laser light. Therefore, if the controlled device is configured such that data must be transmitted according to the first protocol in at least part of the transmission path, it will take a relatively long time, during manufacture of an optical transceiver, to perform the process to store the data in the memory provided in the optical transceiver.

In contrast, if the optical transceiver is configured as the controlled device 10 according to the first embodiment, the time required for manufacturing the optical transceiver can be reduced.

Second Embodiment

Figure 5:
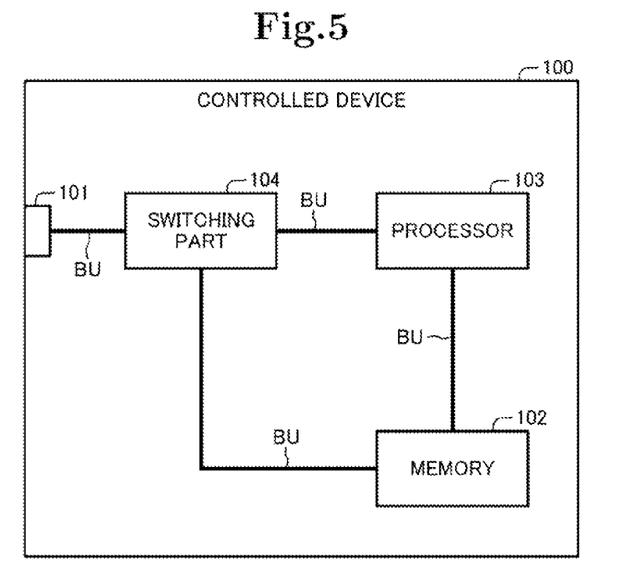
FIG. 5 is a diagram schematically illustrating a configuration of a controlled device according to a second embodiment of this invention.

Next, a controlled device according to a second embodiment of this invention will be described with reference to FIG. 5.

A controlled device 100 according to the second embodiment includes: an external terminal 101; a memory 102 for storing data; a processor 103 for receiving a control signal via an external terminal 101 and controlling the memory 102 based on the received control signal; a plurality of buses BU forming a first transmission path connecting the external terminal 101 and the memory 102 via the processor 103, and a second transmission path connecting the external terminal 101 and the memory 102 directly by bypassing the processor 103; and a switching part (switching unit) 104 switching the transmission state to either a first transmission state in which one or more of the buses BU forming the first transmission path are caused to transmit the control signal from the external terminal 101 to the processor 103 according to a first protocol and to transmit data between the processor 103 and the memory 102 according to a second protocol capable of transmitting data at a higher rate than the first protocol, or a second transmission state in which the buses BU forming the second transmission path are caused to transmit data directly between the external terminal 101 and the memory 102 according to the second protocol.

This configuration makes it possible to rapidly transmit data between the external terminal 101 and the memory 102 according to the second protocol by switching the transmission state to the second transmission state. Accordingly, rapid data transmission between the external terminal 101 and the memory 102 is made possible without increasing the number of external terminals 101. As a result, for example, data received from the controller can be rapidly stored (written) in the memory 102.

Although this invention has been described by way of example with reference to embodiments thereof, it is to be understood that the invention is not limited to these embodiments, but various modifications to specific configurations and particulars thereof will occur to those skilled in the art without departing from the spirit and scope of the invention.

For example, although the controller 30 is formed of a single unit, it may be formed of a plurality of units. For example, the controller 30 may be formed of a first unit and a second unit, the first unit including a control signal output part 31, an instruction signal output part 32, and a switching signal output part 34, the second unit including a switch 33 and an output signal line 41.

In the exemplary embodiments described above, the functions of the controller 30 are implemented by hardware such as circuits. However, the controller 30 may be configured to have a processor and a storage device for storing a computer program (software), and to perform the functions thereof by the processor executing the computer program. In this case, the program may be stored on a computer-readable recording medium. The possible recording medium is for example a medium with portability such as a flexible disk, an optical disk, a magneto-optical disk, and a semiconductor memory.

Further, an arbitrary combination of the embodiments and modification examples described above may be employed as another modification of the embodiments.

<Supplementary Note>

The whole or part of the embodiments described above may be described as the following Supplementary Notes, but not limited thereto.

(Supplementary Note 1)

A controlled device comprising:

an external terminal;

a memory for storing data;

a processor for receiving a control signal via the external terminal and controlling the memory based on the received control signal;

a plurality of buses forming a first transmission path connecting the external terminal and the memory via the processor, and a second transmission path connecting the external terminal and the memory directly by bypassing the processor; and a switching unit for switching a transmission state to either a first transmission state in which one or more of the buses forming the first transmission path are caused to transmit the control signal from the external terminal to the processor according to a first protocol and to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol.

According to this configuration, data can be transmitted between the external terminal and the memory according to the second protocol by switching the transmission state to the second transmission state. Therefore, rapid data transmission between the external terminal and the memory is made possible without increasing the number of external terminals. As a result, for example, data received from the controller can be rapidly stored (written) in the memory.

(Supplementary Note 2)

The controlled device according to Supplementary Note 1, wherein the plurality of buses include:
a common bus forming part of the first transmission path and part of the second transmission path, one end of the common bus being connected to the external terminal, and the common bus being designed to be able to transmit data according to any one of the first protocol and the second protocol;
a first bus forming part of the first transmission path, one end of the first bus being configured to be connectable to the end of the common bus not connected to the external terminal, and the other end of the first bus being connected to the processor; and
a second bus forming part of the second transmission path, one end of the second bus being configured to be connectable to the end of the common bus not connected to the external terminal, and the switching unit comprises:
a first switch a connection state of which is switchable between a first connection state in which the common bus and the first bus are connected to each other while the common bus and the second bus are disconnected from each other, and a second connection state in which the common bus and the first bus are disconnected from each other while the common bus and the second bus are connected to each other.

(Supplementary Note 3)

The controlled device according to Supplementary Note 2, wherein:

the plurality of buses include:
a third bus forming part of the first transmission path and part of the second transmission path, one end of the third bus being connected to the memory, and the third bus being designed to be able to transmit data according to the second protocol; and
a fourth bus forming part of the first transmission path, one end of the fourth bus being configured to be connectable to the end of the third bus not connected to the memory, and the other end of the fourth bus being connected to the processor;

the end of the second bus not connected to the common bus is configured to be connectable to the end of the third bus not connected to the memory, and the switching unit comprises:
a second switch a connection state of which is switchable between a first connection state in which the third bus and the fourth bus are connected to each other while the third bus and the second bus are disconnected from each other, and a second connection state in which the third bus and the fourth bus are disconnected from each other while the third bus and the second bus are connected to each other.

(Supplementary Note 4)

The controlled device according to Supplementary Note 3, wherein the switching unit is configured such that, when a first switching signal is input to the controlled device, the transmission state is switched to the first transmission state by switching the first switch to the first connection state and switching the second switch to the first connection state, and, when a second switching signal is input to the controlled device, the transmission state is switched to the second transmission state by switching the first switch to the second connection state and switching the second switch to the second connection state.

(Supplementary Note 5)

The controlled device according to any of Supplementary Notes 1 to 4, wherein the first protocol is $I^2C$ (Inter-Integrated Circuit) protocol, and the second protocol is SPI (Serial Peripheral Interface) protocol.

(Supplementary Note 6)

The controlled device according to any one of Supplementary Notes 1 to 5, wherein the controlled device is an optical transceiver receiving an optical signal.

When the controlled device is an optical transceiver, a relatively large number of control parameters must be preliminarily stored in a memory in order to control the output of laser light. Accordingly, there arises a problem that it takes a relatively long time to perform the process to store data in the memory provided in the optical transceiver during manufacture of the optical transceiver. According to this invention, the time required for manufacturing the optical transceiver can be shortened by applying the configuration of the controlled device of the invention to the optical transceiver.

(Supplementary Note 7)

The controlled device according to any one of Supplementary Notes 1 to 6, wherein the memory is a non-volatile memory.

(Supplementary Note 8)

A controlled method applicable to a controlled device comprising:
an external terminal;
a memory for storing data;
a processor for receiving a control signal via the external terminal and controlling the memory based on the received control signal;
a plurality of buses forming a first transmission path connecting the external terminal and the memory via the processor, and a second transmission path connecting the external terminal and the memory directly by bypassing the processor, the controlled method comprising switching a transmission state to either a first transmission state in which one or more of the buses forming the first transmission path are caused to transmit the control signal from the external terminal to the processor according to a first protocol and to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol.

(Supplementary Note 9)

The controlled method according to Supplementary Note 8, wherein:

the plurality of buses include:
a common bus forming part of the first transmission path and part of the second transmission path, one end of the common bus being connected to the external terminal, and the common bus being designed to be able to transmit data according to any one of the first protocol and the second protocol;
a first bus forming part of the first transmission path, one end of the first bus being configured to be connectable to the end of the common bus not connected to the external terminal, and the other end of the first bus being connected to the processor; and a second bus forming part of the second transmission path, one end of the second bus being configured to be connectable to the end of the common bus not connected to the external terminal; and the controlled method comprises:

switching a connection state, by the first switch, between a first connection state in which the common bus and the first bus are connected to each other while the common bus and the second bus are disconnected from each other, and a second connection state in which the common bus and the first bus are disconnected from each other while the common bus and the second bus are connected to each other.

(Supplementary Note 10)

The controlled method according to Supplementary Note 9, wherein:

the plurality of buses include:

a third bus forming part of the first transmission path and part of the second transmission path, one end of the third bus being connected to the memory and the third bus being designed to be able to transmit data according to the second protocol; and a fourth bus forming part of the first transmission path, one end of the fourth bus being configured to be connectable to the end of the third bus not connected to the memory, and the other end of the fourth bus being connected to the processor;

the end of the second bus not connected to the common bus is configured to be connectable to the end of the third bus not connected to the memory; and the controlled method comprises:

switching a connection state, by the second switch, between a first connection state in which the third bus and the fourth bus are connected to each other while the third bus and the second bus are disconnected from each other, and a second connection state in which the third bus and the fourth bus are disconnected from each other while the third bus and the second bus are connected to each other.

(Supplementary Note 11)

A controller configured to be connectable to an external terminal provided in a controlled device and comprising:

a control signal output unit for outputting a control signal to the controlled device via the external terminal according to a first protocol, the control signal being for causing a processor provided in the controlled device to control a memory; and an instruction signal output unit for outputting an instruction signal to the controlled device via the external terminal according to a second protocol capable of transmitting data at a higher rate than the first protocol, the instruction signal being for instructing the controlled device to directly exchange data between the controller and the memory provided in the controlled device.

(Supplementary Note 12)

The controller according to Supplementary Note 11, wherein:

the controller further comprises a switching signal output unit for outputting either a first switching signal or a second switching signal;

the control signal output unit is configured to output the control signal when the first switching signal is output; and the instruction signal output unit is configured to output the instruction signal when the second switching signal is input.

(Supplementary Note 13)

A control system comprising a controller and a controlled device, the controlled device comprising:

an external terminal;

a memory for storing data;

a processor for receiving a control signal via the external terminal and controlling the memory based on the received control signal; and a plurality of buses forming a first transmission path connecting the external terminal and the memory via the processor, and a second transmission path connecting the external terminal and the memory directly by bypassing the processor;

the controller being configured to be connectable to the external terminal provided in the controlled device, and comprising;

a control signal output unit for outputting a control signal to the controlled device via the external terminal according to a first protocol, the control signal being for causing the processor provided in the controlled device to control the memory, an instruction signal output unit for outputting an instruction signal to the controlled device via the external terminal according to a second protocol capable of transmitting data at a higher rate than the first protocol, the instruction signal being for instructing the controlled device to directly exchange data with the memory provided in the controlled device; and the controlled device further comprising a switching unit for switching a transmission state to either a first transmission state in which one or more of the buses forming the first transmission path are caused to transmit the control signal from the external terminal to the processor according to the first protocol and to transmit data between the processor and the memory according to the second protocol, or a second transmission state in which one or more of the buses forming the second transmission path are caused to transmit data directly between the external terminal and the memory according to the second protocol.

This invention is applicable to any controlled device controlled by a control signal received from a controller, and to an optical transceiver or the like receiving an optical signal.

What is claimed is:

1. A controlled device comprising:

an external terminal;

a memory for storing data;

a processor for receiving a control signal via the external terminal and controlling the memory based on the received control signal;

a plurality of buses forming a first transmission path connecting the external terminal and the memory via the processor, and a second transmission path connecting the external terminal and the memory directly by bypassing the processor; and a switching unit for switching a transmission state to either a first transmission state in which one or more of the buses forming the first transmission path are caused to transmit the control signal from the external terminal to the processor according to a first protocol and also to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol; wherein the plurality of buses include:
- a common bus forming part of the first transmission path and part of the second transmission path, one end of the common bus being connected to the external terminal, and the common bus being designed to be able to transmit data according to any one of the first protocol and the second protocol;
- a first bus forming part of the first transmission path, one end of the first bus being configured to be connectable to the end of the common bus not connected to the external terminal, and the other end of the first bus being connected to the processor; and
- a second bus forming part of the second transmission path, one end of the second bus being configured to be connectable to the end of the common bus not connected to the external terminal, and
- a third bus forming part of the first transmission path and part of the second transmission path, one end of the third bus being connected to the memory, and the third bus being designed to be able to transmit data according to the second protocol; and
- a fourth bus forming part of the first transmission path, one end of the fourth bus being configured to be connectable to the end of the third bus not connected to the memory, and the other end of the fourth bus being connected to the processor;

the end of the second bus not connected to the common bus is configured to be connectable to the end of the third bus not connected to the memory, and the switching unit comprises:
- a first switch a connection state of which is switchable between a first connection state in which the common bus and the first bus are connected to each other while the common bus and the second bus are disconnected from each other, and a second connection state in which the common bus and the first bus are disconnected from each other while the common bus and the second bus are connected to each other; and
- a second switch a connection state of which is switchable between a first connection state in which the third bus and the fourth bus are connected to each other while the third bus and the second bus are disconnected from each other, and a second connection state in which the third bus and the fourth bus are disconnected from each other while the third bus and the second bus are connected to each other.

2. The controlled device according to claim 1, wherein the switching unit is configured such that, when a first switching signal is input to the controlled device, the transmission state is switched to the first transmission state by switching the first switch to the first connection state and switching the second switch to the first connection state, and, when a second switching signal is input to the controlled device, the transmission state is switched to the second transmission state by switching the first switch to the second connection state and switching the second switch to the second connection state.

3. The controlled device according to claim 1, wherein the memory is a non-volatile memory.

4. A controlled device comprising:
an external terminal;
a memory for storing data;
a processor for receiving a control signal via the external terminal and controlling the memory based on the received control signal;
a plurality of buses forming a first transmission path connecting the external terminal and the memory via the processor, and a second transmission path connecting the external terminal and the memory directly by bypassing the processor; and
a switching unit for switching a transmission state to either a first transmission state in which one or more of the buses forming the first transmission path are caused to transmit the control signal from the external terminal to the processor according to a first protocol and also to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol, wherein the first protocol is I$^2$C (Inter-Integrated Circuit) protocol, and the second protocol is SPI (Serial Peripheral Interface) protocol.

5. A controlled device comprising:
an external terminal;
a memory for storing data;
a processor for receiving a control signal via the external terminal and controlling the memory based on the received control signal;
a plurality of buses forming a first transmission path connecting the external terminal and the memory via the processor, and a second transmission path connecting the external terminal and the memory directly by bypassing the processor; and
a switching unit for switching a transmission state to either a first transmission state in which one or more of the buses forming the first transmission path are caused to transmit the control signal from the external terminal to the processor according to a first protocol and also to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol, wherein the controlled device is an optical transceiver receiving an optical signal.

6. A controlled method applicable to a controlled device comprising:
an external terminal;
a memory for storing data;
a processor for receiving a control signal via the external terminal and controlling the memory based on the received control signal; and
a plurality of buses forming a first transmission path connecting the external terminal and the memory via the processor, and a second transmission path connecting the external terminal and the memory directly by bypassing the processor,
the controlled method comprising switching a transmission state to either a first transmission state in which one or more of the buses forming the first transmission path are caused to transmit the control signal from the external terminal to the processor according to a first protocol and to transmit data between the processor and the memory according to a second protocol capable of transmitting data at a higher rate than the first protocol, or a second transmission state in which one or more of the buses forming the second transmission path are caused to transmit data directly between the external terminal and the memory according to the second protocol, wherein:

the plurality of buses include:
- a common bus forming part of the first transmission path and part of the second transmission path, one end of the common bus being connected to the external terminal, and the common bus being designed to be able to transmit data according to any one of the first protocol and the second protocol;
- a first bus forming part of the first transmission path, one end of the first bus being configured to be connectable to the end of the common bus not connected to the external terminal, and the other end of the first bus being connected to the processor; and
- a second bus forming part of the second transmission path, one end of the second bus being configured to be connectable to the end of the common bus not connected to the external terminal; and
  - a third bus forming part of the first transmission path and part of the second transmission path, one end of the third bus being connected to the memo and the third bus being designed to be able to transmit data according to the second protocol; and
  - a fourth bus forming part of the first transmission path, one end of the fourth bus being configured to be connectable to the end of the third bus not connected to the memory, and the other end of the fourth bus being connected to the processor;
- the end of the second bus not connected to the common bus is configured to be connectable to the end of the third bus not connected to the memory; and
- the controlled method comprises:
  - switching a connection state, by the first switch, between a first connection state in which the common bus and the first bus are connected to each other while the common bus and the second bus are disconnected from each other, and a second connection state in which the common bus and the first bus are disconnected from each other while the common bus and the second bus are connected to each other, and
  - switching a connection state, by the second switch, between a first connection state in which the third bus and the fourth bus are connected to each other while the third bus and the second bus are disconnected from each other, and a second connection state in which the third bus and the fourth bus are disconnected from each other while the third bus and the second bus are connected to each other.

* * * * *